United States Patent [19]

Ito et al.

[11] 4,176,929

[45] Dec. 4, 1979

[54] EXPOSURE CONTROL DEVICE FOR A CAMERA

[75] Inventors: Fumio Ito; Tokuichi Tsunekawa, both of Yokohama; Tetsuya Taguchi, Kawasaki; Isao Harigaya, Yokohama, all of Japan

[73] Assignee: Canon Kabushiki Kaisha, Tokyo, Japan

[21] Appl. No.: 917,375

[22] Filed: Jun. 20, 1978

[30] Foreign Application Priority Data

Jun. 21, 1977 [JP] Japan .................................. 52-73512
Jun. 29, 1977 [JP] Japan .................................. 52-77448
Jul. 14, 1977 [JP] Japan .................................. 52-84411

[51] Int. Cl.² ..................... G03B 7/08; G03B 15/05; G03B 19/12
[52] U.S. Cl. ........................... 354/29; 354/31; 354/49; 354/128; 354/152
[58] Field of Search .................... 354/29–32, 354/42, 49, 59, 60 F, 127, 128, 149, 129, 246, 230, 231, 60 R, 50, 51, 38, 139, 152

[56] References Cited

U.S. PATENT DOCUMENTS

| 3,470,798 | 10/1969 | Miyakawa | 354/31 X |
| 3,860,936 | 1/1975 | Harvey | 354/31 X |
| 3,864,699 | 2/1975 | Tsunekawa et al. | 354/31 |
| 3,889,276 | 6/1975 | Shirai | 354/31 |
| 4,040,111 | 8/1977 | Lindner et al. | 354/49 |
| 4,065,777 | 12/1977 | Maitani et al. | 354/59 X |
| 4,072,961 | 2/1978 | Yamada | 354/31 X |
| 4,076,977 | 2/1978 | Tsunekawa et al. | 354/60 R X |

OTHER PUBLICATIONS

Sharp Semiconductor Technical Manual, 'Application to Cameras', Mar. 1974, pp. 6 & 11.

Primary Examiner—L. T. Hix
Assistant Examiner—William B. Perkey
Attorney, Agent, or Firm—Toren, McGeady and Stanger

[57] ABSTRACT

An exposure control device for a camera, having a first light receiving element for sensing light beams reflected from a film surface and a second light receiving element for sensing light beams from an object before taking a photograph. In this arrangement an auxiliary diaphragm, which is opened as a shutter is closed and is closed as the shutter is opened, is provided in front of the second light receiving element. The first and second light receiving elements are connected in parallel between input terminals of an operational amplifier for the light measuring. Accordingly, an exposure control with a high degree of accuracy is effected based on an output of the light measuring operational amplifier.

20 Claims, 21 Drawing Figures

EXPOSURE CONTROL DEVICE FOR A CAMERA

BACKGROUND OF THE INVENTION

1. Field of the Invention

The present invention relates to an exposure control device for a camera in which transient responsive characteristics of a light measuring circuit are improved.

2. Description of the Prior Art

A conventional light measuring circuit employing a photo-electric conversion element of a photo-voltaic type as a light receiving element has an operational amplifier with a high input impedance utilizing an FET at its input stage connected to said light receiving element. Unnecessary charging is instantaneously performed by stray capacitances since capacitance exists; at a gate of the FET when a power is supplied from a power source, junction capacitance exits in the light receiving element and there exists capacitance in the printed circuit network, etc. A certain length of time is necessary to discharge such unnecessary charge. Thus, the light measuring circuit is difficult to stabilize. This disadvantage is serious, in particular, when the amount of photo-current is small when a very weak light is sensed.

Furthermore, since a photo-current to a logarithmic conversion diode inserted in a negative feedback circuit is cut off in a conventional light measuring circuit in a blacked-out state, negative feedback will not work on the operational amplifier with a high input impedance, and an output of the amplifier will become either a high level or a low level signal depending on a direction of the diode. That is, the amplifier is latched. Therefore, some length of time is necessary to release said latch of the amplifier before the next photograph is to be taken and follower characteristics of the light measuring circuit against an amount of incident light become poor.

These disadvantages constitute drawbacks especially when light beams reflected from a film surface are sensed to effect control over an exposure time. That is, the light are beams reflected from a film surface to the light receiving element as a shutter is released. Also, in a camera in which light beams reflected from a film surface are sensed to effect exposure control, a closing signal has to be provided by a shutter control electromagnet before the light beams reflected from a film surface have sufficiently impinged when a high speed shutter control is performed. Thus, an accurate exposure time control could not have been made.

An object of the present invention is to eliminate said disadvantages, and is to provide an exposure control device for a camera which is made so that a first light receiving element that senses light beams reflected from a film surface and effects an exposure control is connected between input terminals of a light measuring operational amplifier while a second light receiving element that senses light beams from an object before a photo-taking and make a preliminary display of an exposure is connected in parallel with the first light receiving element, so that transient responsive characteristics of a light measuring circuit at the time a photograph is taken are improved.

Another object of the present invention is to provide an automatic exposure control device for a camera in which an accurate exposure control is effected based on a signal synthesized from an output of the first light receiving element that senses light beams reflected from a film surface as a shutter is opened and from the second light receiving element which stops sensing light beams from an object as a shutter is opened.

Further, another object of the present invention is to provide an exposure control device for a camera in which an appropriate amount of biasing light beams is made to impinge, at the time a photograph is to be taken, into a light receiving element which senses light beams from an object before a photograph is taken in order to make a preliminary display of an exposure.

BRIEF DESCRIPTION OF THE DRAWINGS

FIGS. 2(a), (b), (c) are to show a mechanism of a shutter shown in FIG. 1, wherein FIG. 2(a) is a system diagram for a shutter mechanism before a photograph is taken, and FIG. 2(b) is a system diagram of the shutter mechanism just after a shutter release, while FIG. 2(c) is a system diagram of the shutter mechanism being fully opened at a time of a photograph is taken.

FIGS. 5(a), (b), (c) are to show a shutter mechanism of a camera according to the second example of the present invention, wherein FIG. 5(a) is a system diagram of the shutter mechanism before a photograph is taken, and FIG. 5(b) is a system diagram of the shutter mechanism just after a shutter release, while

DESCRIPTION OF THE PREFERRED EMBODIMENTS

Now, the first example of the present invention will be explained referring to FIG. 1 to FIG. 4.

Figure 1:
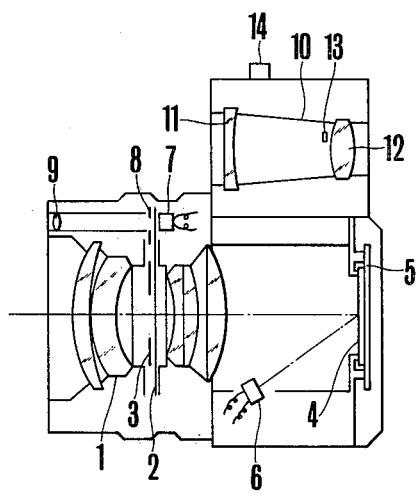
FIG. 1 is a system diagram of a camera according to the first example of the present invention.

FIG. 1 shows an arrangement of a camera, wherein the numeral 1 shows an objective lens having a shutter 3 which also works as a diaphragm. The numeral 2 shows a base plate of the shutter. The numeral 4 shows a film, 5 a pressing plate, 6 a first light receiving element made of, for example, silicon photo-diode, etc., wherein the first light receiving element 6 senses light beams which penetrate through the objective lens at a time of a photograph is taken and are reflected from a film surface. The numeral 7 shows a second light receiving element made of, for example, silicon photo-diode, etc. and an auxiliary diaphragm 8, which is associated with the shutter 3 working also as a diaphragm, is positioned in front of the second light receiving element 7. The numeral 9 shows a lens. Light beams penetrating through this lens 9 are projected on the second light receiving element 7 through the auxiliary diaphragm 8 before a photograph is taken. The numeral 10 shows a view finder having an objective lens 11 and an eye piece 12. The numeral 13 shows a meter, and a pointer of this meter is viewed from the view finder. The numeral 14 shows a shutter button.

FIGS 2(a), 2(b), 2(c) shows the shutter 3 and the auxiliary diaphragm 8 shown in FIG. 1, wherein the numeral 21 shows a solenoid controlled by a circuit to be described below. The numeral 22 is a plunger being shifted the left and right by the solenoid 21. The numeral 23 is a shutter driving lever being rotatively biased in a clockwise direction by a spring 24, wherein the lever 23 is rotated in a counter-clockwise direction resisting the spring 24 as a pin 23a mounted thereon is pressed to the right by the plunger 22. The numeral 25 is a stopper pin used to restrict the rotation in a clockwise direction of the driving lever 23. Said driving lever 23 has grooves 23d and 23c provided therein. A shaft 26a and a shaft 27a of a first shutter blade 26 and a second shutter blade 27 are made to go through said grooves 23d and 23c, respectively. The first and second shutter blades 26 and 27 overlap and are made to be movable with respect to each other. The numerals 26b, 26c, 27b and 27c show guide grooves, and the numerals 2a and 2b show guide pins provided at the shutter base plate 2. The shutter plate 2 has a holed part 2c for exposure and a holed part 2d for the light receiving element 7 provided therein. Also, the first shutter blade 26 and the second shutter blade 27 have perforated holes 26d and 27d of a tear drop shape to restrict an amount of exposure onto a film surface, and perforated holes 26e and 27e to restrict light beams to the second light receiving element 7 provided therein, respectively. In FIG. 2(a) before a shown photograph is taken, the perforated holes 26e and 27e overlap and light beams from an object are projected on the second light receiving element 7, and the perforated holes 26d and 27d do not overlap, therefore, light beams reflected from a film surface 4 do not irradiate the first light receiving element 6. Also, in FIG. 2(c) shown at a time when a photograph is taken, the perforated holes 26d and 27d overlap and light beams reflected from the film plane 4 irradiate the first light receiving element 6. The perforated holes 26e and 27e do not overlap, therefore, light beams from an object do not irradiate the second light receiving element 7. Also, the mechanism is so made that both of perforated holes 26e and 27e as well as perforated holes 26d and 27d are opened as shown in FIG. 2(b) in a process shifting from FIG. 2(a) to FIG. 2(c).

Figure 3:
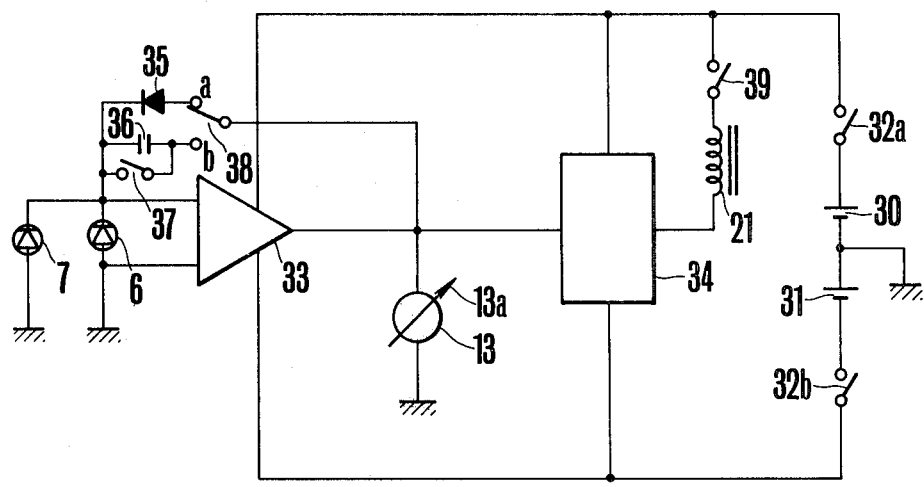
FIG. 3 is an exposure control circuit diagram of a camera shown in FIG. 1 having the shutter mechanism shown in FIG. 2.

Now, FIG. 3 shows an exposure control circuit for a camera shown in FIG. 1, wherein the numerals 30 and 31 show power source batteries, and the numerals 32a and 32b show main switches, wherein the switch 32b is opened and closed in an association with the switch 32a. A control circuit 34 composed of an operational amplifier 33 and, for example, a Schmidt trigger circuit is connected to the power source batteries 30 and 31 through the main switches 32a and 32b. The first light receiving element 6 and the second light receiving element 7 are connected in parallel between input terminals of the operational amplifier 33. The numeral 35 shows a logarithmic compression diode, and the numeral 36 shows a time constant capacitor, while the numeral 37 shows a counting switch. The numeral 38 is a change over switch, and this change over switch 38 is connected to the logarithmic compression diode 35 as it is connected to a contact "a", while it is connected to the time constant capacitor 36 as it is changed over to a contact "b". The numeral 21 shows a solenoid which has its conductance controlled by the control circuit corresponding to an output of the operational amplifier 33, and the numeral 39 shows a safety switch of the solenoid 21.

Figure 4:
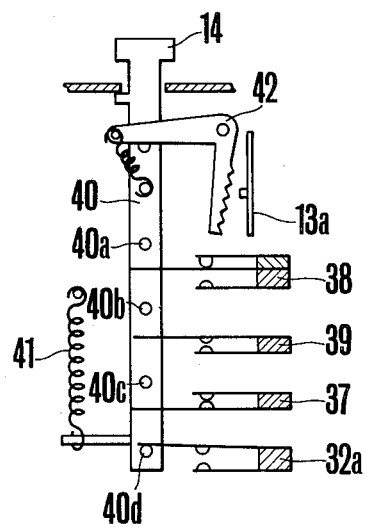
FIG. 4 is a diagram to show a relationship between a shutter button and each of the switches shown in FIG. 3.

FIG. 4 shows a relationship between the shutter button 14 and each of the switches, wherein the numeral 40 shows a shaft of the shutter button 14 being biased in an upper direction by a spring 41. Pins 40a, 40b, 40c, 40d are provided at the shaft 40, and the change over switch 38 has its change over action controlled by the pin 40a. The switches 37, 39, 32a have their openings and closings controlled by the pins 40b, 40c, 40d. When the shutter button 14 is pressed down, first the switch 32a is closed, next, the change over switch 38 is changed over and connected to the contact "b", then almost at about same time the switch 37 is turned OFF and the switch 39 is turned ON. The numeral 42 shows a lever to clamp the meter pointer 13a as the shutter button 14 is pressed down.

Now, function of the above mentioned arrangement will be explained.

When the main switches 32a, 32b are turned ON by pressing down the shutter button 14, unnecessary charging to such stray capacities as the capacitance of a field effect transistor provided at an input stage of the operational amplifier 33, etc., occurs. However, since the first and second shutter blades 26, 27 are in a state shown in FIG. 2(a) at this time, the perforated holes 26e and 27e overlap and light beams from an object are projected onto the second light receiving element 7 through the holed part 2d. Therefore, the unnecessarily accumulated charge an the stray capacitance is instantaneously discharged by a photo-current of the second light receiving element 7, and the light measuring circuit is placed in a stable state. Also, an output of the operational amplifier 33 which has been logarithmically compressed causes the pointer 13a of the meter 13 to swing. While said output of the operational amplifier 33 is added also to the control circuit 34, as the switch SW4 is turned OFF, the solenoid 21 is not turned ON. Successive pressing down of the shutter button 14 causes the lever 42 to rotate in a counterclockwise direction to clamp the pointer 13a of the meter 13. The change over switch 38 is changed over from the contact "a" to the contact "b" by further successive pressing down of the shutter button 14. While a voltage across the meter 13 changes at this time, the pointer 13a of the meter 13 is clamped, therefore, a photographer can see the pointer in a stationary condition change through a view finder. Next, at the same time when the counting switch 37 is turned OFF and a current begins to flow to the time constant capacitor 36, the switch 39 is turned ON and power is conducted to the solenoid 21. Thus, the shutter 3 starts functioning. That is, as the solenoid 21 has power conducted thereto, the plunger 22 is shifted to the right to rotate the driving lever 23 in a counter-clockwise direction. Therefore, the first shutter blade 26 starts shifting to the right and the second shutter blade 27 starts shifting to the left, thus the holed part 2c starts to be opened as the perforated holes 26d and 27d start overlapping, while the holed part 2d starts to be closed as the overlapping of the perforated holes 26e and 27e is rapidly released. Therefore, the light beams penetrating through the photo-taking lens 1 are reflected at the film surface 4 to the first light receiving element 6. Thus, photo-current starts flowing. Since light beams from an object have been impinging on the second light receiving element 7 until this time, a stable state of the light measuring circuit is retained, and the light measuring circuit can function without a delay in response to the output of the first light receiving element 6. And as the first and second shutter blades 26, 27 further move and an opening of the holed part 2c becomes larger and becomes closer to a state of FIG. 2(c), an amount of incident light into the first light receiving element 6 increases. And when a voltage of the charge accumulated at the capacitor 36 reaches a prescribed voltage, the control circuit 34 is inverted and the solenoid 21 is placed in a non-conductive state. Therefore, as the plunger 22 is shifted to the left and resumes its original state, the driving lever 23 rotates in a clockwise direction by the spring 24.

Therefore, the first shutter blade 26 is shifted to the left and the second shutter blade 27 is shifted to the right. Thus, both of the blades return to their original state shown in FIG. 2(a) and an exposure is completed. And when the pressing of the shutter button 14 is released, the switch 39 is turned OFF, and at a same time, the counting switch 37 becomes ON, then the change over switch 38 is changed over to the contact "a", releasing the clamping of the pointer 13a of the meter 13 by the lever 42 and placing the main switch 32a in an OFF state. By this, every component returns to its original state.

As has been explained above, in the first example of the present invention, a first light receiving element for sensing light beams reflected from a film surface for effecting an exposure control is connected between the input terminals of a light measuring operational amplifier, and a second light receiving element to sense light beams from an object before taking a photograph for making a preliminary display of an exposure is connected in parallel with the first light receiving element, thereby instantly discharging unnecessarily accumulated charge generated at a light measuring circuit and stored in stray capacitance, to place the light measuring circuit in a stable state, thereby improving follower characteristics of the light measuring circuit to an amount of incident light to the first light receiving element at a time a photograph is taken, so that transient responsive characteristics of the light measuring circuit can be improved.

Next, explanations will be made of the second example of the present invention referring to FIGS. 5 to 12. Since the arrangement of the shutter in a camera is similar to that in FIG. 1, explanations therefor will be omitted.

Figure 5:
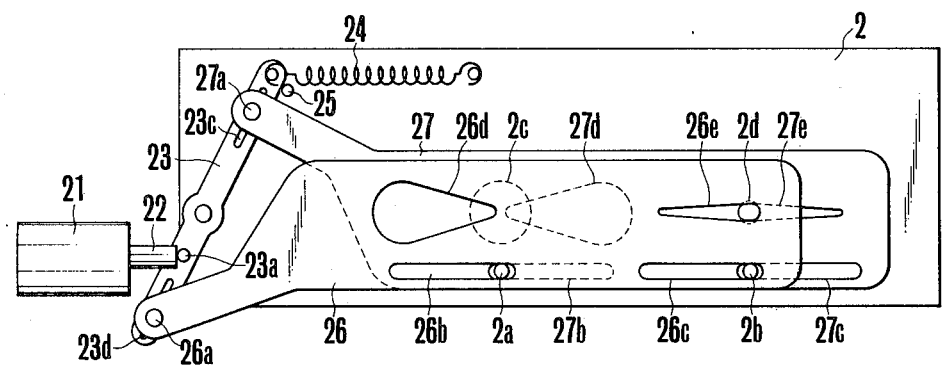
Figure 5:
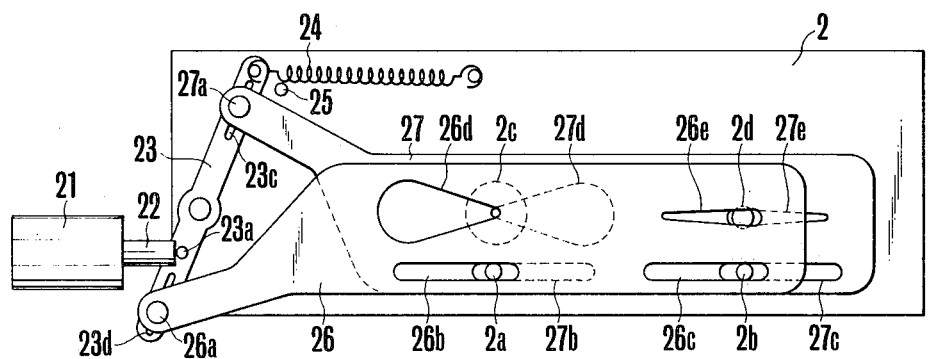
Figure 5C:
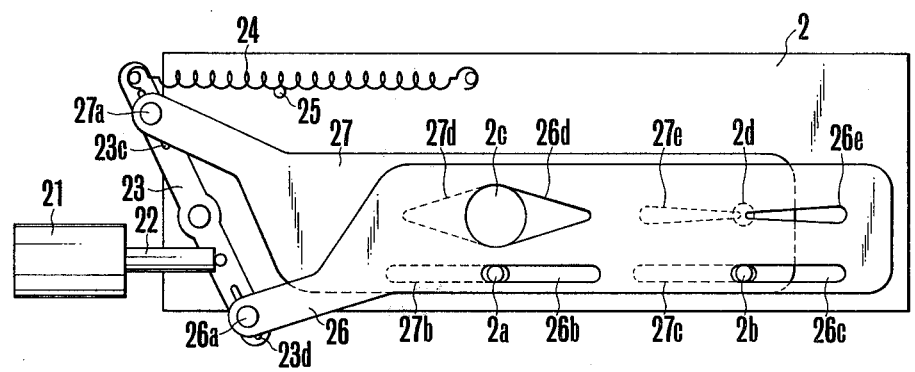
FIG. 5(c) is a system diagram of the shutter mechanism being fully opened at a time a photograph is taken.

FIGS. 5(a), 5(b), 5(c) show a relationship between the shutter and the auxiliary diaphragm shown in FIG. 1, wherein explanations will be made only on a difference from FIG. 2, and said difference lies in a shape of opening of the perforated holes 26e and 27e.

That is, the perforated holes 26e and 27e overlap to form an opening of the auxiliary diaphragm 8, and the perforated holes 26d and 27d overlap to form an opening of the shutter 3, wherein the auxiliary diaphragm 8 is placed in the fully opened state as shown in FIG. 5(a) before taking a photograph that is when the shutter 3 is closed. The auxiliary diaphragm 8 is placed in a closed state as shown in FIG. 5(c) when the shutter 3 is fully opened. Furthermore, the auxiliary diaphragm 8 is also gradually closing as shown in FIG. 5(b) when the shutter 3 is in a course of being opened. And the rate of change of the shutter opening as the shutter 3 is gradually released is so set as equal the rate of change in opening as the auxiliary diaphragm 8 is gradually closed. And this makes the sum of the photo-current P1 of the first light receiving element 6 and the photo-current P2 of the second light receiving element 7 always constant as shown in FIG. 6.

Figure 6:
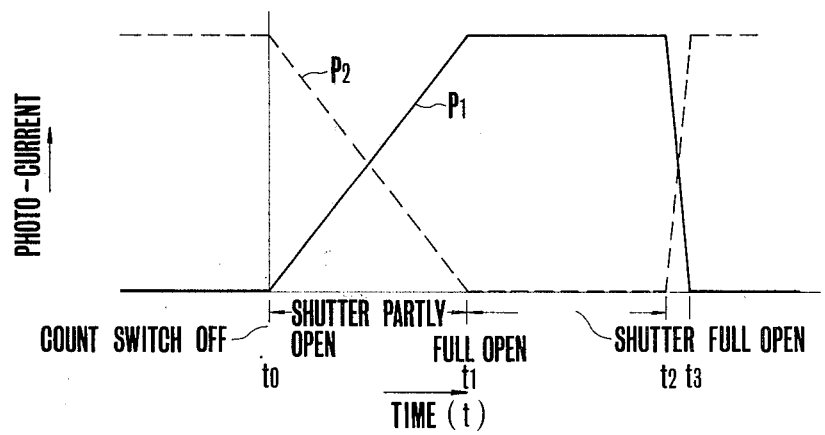
FIG. 6 is a diagram to show properties of photo-current of the first and second light receiving elements of a camera shown in FIG. 1 having the shutter mechanism shown in FIG. 5.

In FIG. 6, what is shown as t0 to t1 is the shutter time opening interval for the shutter 3 from the moment the shutter starts opening till the moment it is fully opened. What is shown as t1 to t2 is a time interval during which the shutter 3 is fully opened, while what is shown as t2 to t3 is the shutter time closing interval for the shutter from the moment the shutter starts closing till the moment it is completely closed. Therefore, shapes of openings of both of the perforated holes 26e and 27e shown in FIG. 5 are longer in a lateral direction.

Figure 7:
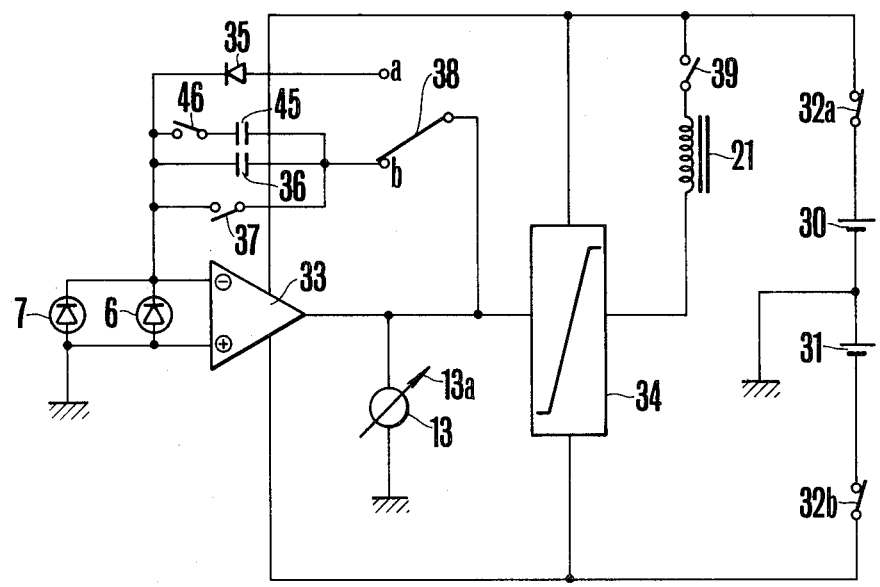
FIG. 7 is an exposure control circuit diagram of a camera shown in FIG. 1 having the shutter mechanism shown in FIG. 5.

Now, FIG. 7 shows an exposure control circuit of a camera shown in FIG. 1 having a shutter mechanism shown in FIG. 5, and explanations will be made only on the difference from the circuit shown in FIG. 3. The numeral 45 is a capacitor connected in parallel with the above mentioned time constant capacitor 36, and as an aperture of the shutter 3 changes from the moment the shutter 3 starts opening till the moment it is fully opened, the charging time to the time constant capacitor 36 is made longer. The numeral 46 shows a switch connected in series with the capacitor 45, and this switch 46 is turned OFF in association with, for example, the shutter blades 26, 27 or the driving lever 23 when the shutter 3 is fully opened.

Also, since the relationship between each switch and the shutter button is made in a same manner as that in FIG. 4, explanations therefor will be omitted.

Next, function of the above mentioned arrangement will be explained.

When the turned switches 32a, 32b are made ON by pressing down the shutter button 14, unnecessary charging to such stray capacitance as that of a field effect transistor provided at an input stage of the operational amplifier 33, etc. takes place. However, since the first and second shutter blade 26, 27 so overlap as placing the auxiliary diaphragm 8 in a fully opened state as shown in FIG. 5(a), the above mentioned charge unnecessarily accumulated at the stray capacitance is instantaneously discharged by the photo-current of the second light receiving element 7, and the light measuring circuit is placed in a stable state. Also, an output of the logarithmically compressed operational amplifier 33 makes the pointer 13a of the meter 13 swing. Said output of the operational amplifier 33 is also added to the control circuit 34, but as the switch 39 is in the OFF state, the solenoid 21 does not conduct. The lever 42 rotates in a counter-clockwise direction by successive pressing down of the shutter button 14 to clamp the pointer 13a of the meter 13.

The change over switch 38 is changed over from the contact "a" to the contact "b" by further successive pressing down of the shutter button 14. While the voltage working on the meter 13 at this time varies, since the pointer 13a of the meter 13 is clamped, no variation will be seen from a view finder. Next, at the same time when the counting switch 37 is turned OFF and the charging of time constant capacitor 36 begins, the switch 39 is turned ON and current is conducted through the solenoid 21 and the shutter 3 starts its action. That is, as current is conducted through the solenoid 21, the plunger 22 is shifted to the right in rotate the driving lever 23 to a counter-clockwise direction. Therefore, as the first shutter blade 26 starts shifting to the right and the second shutter blade 27 starts shifting to the left, the perforated holes 26d and 27d start to overlap each other at the holed part 2c, thus the shutter starts opening, and the overlapping of the perforated holes 26e and 27e at the holed part 2d starts to be gradually released and the auxiliary diaphragm 8 starts to close. Therefore, light beams penetrating through the phototaking lens 1 are reflected onto the first light receiving element 6 and photo-current starts flowing.

By this, an output synthesized output from the output of the first light receiving element 6 and the output of the second light receiving element 7 is added to the input of the light measuring operational amplifier 33. And as the first and second shutter blades 26, 27 further shift and the opening of the shutter 3 becomes larger, the opening of the auxiliary diaphragm 8 becomes smaller, thus the state shown in FIG. 5(c) is secured. And when the charge on the capacitor 36 reaches a prescribed voltage, the control circuit 34 is inverted to place the solenoid 21 in a non-conductive state. Therefore, as the plunger 22 is shifted to the left and is returned to its original state, the driving lever 23 is rotated in a clockwise direction by the spring 24. Then, the first shutter blade 26 is shifted to the left and the second shutter blade 27 is shifted to the right, thus both blades return to their original state shown in FIG. 5(a), completing an exposure. And when the pressing of the shutter button 14 is released the switch 39 is turned OFF and counting switch 37 is turned ON, then the change over switch 38 is changed over to the contact "a", releasing the clamping of the pointer 13a of the meter 13 by the lever 42, and placing the main switch 32a in an OFF state. By this all of the components return to their first state.

Figure 8:
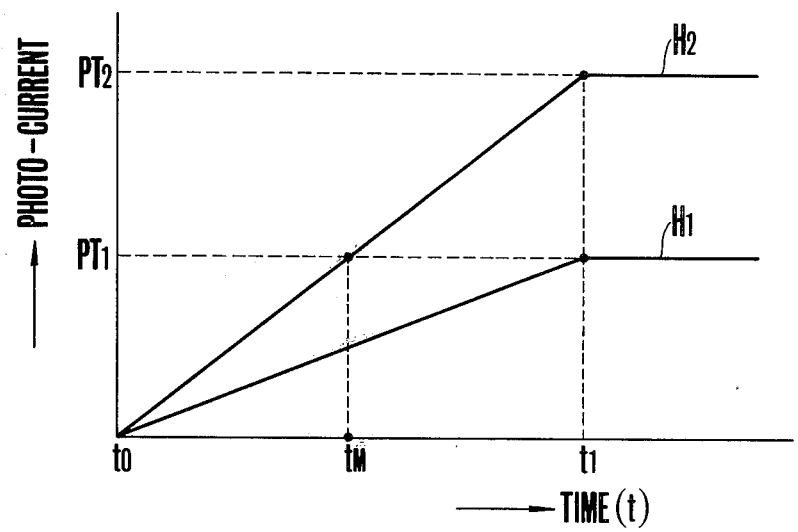
FIG. 8 is a diagram to show lengths of opening time of the shutter shown in FIG. 5 and properties of photo-current of the light receiving element shown in FIG. 1 for receiving the light beams reflected from a film surface.

FIG. 8 shows shutter opening time and photocurrent characteristics of the light receiving element 6 which receives the light beams reflected from the film surface, wherein when the control circuit 34 reaches a trigger level as shown by H1 at the time t1, an amount of exposure L1 to a photo-sensitive material will correspond to the following formula:

$$L1 \propto \frac{1}{2}(t1-t0)PT1$$

Next, when an object brightness becomes two times higher than said level H1 as shown by H2, the following equations are satisfied:

Photo-current PT2=2PT1

Shutter opening time tM=t1/2 and an amount of exposure L2 to a photo-sensitive material will be expressed by:

$$L2 \propto \frac{1}{2}(t1=t0)PT1,$$

and the following equation is satisfied:

$$L2=\frac{1}{2}L1$$

That is, when a brightness becomes two times higher, a shutter opening time becomes ½ and an exposure to a photosensitive material becomes ½.

Figure 9:
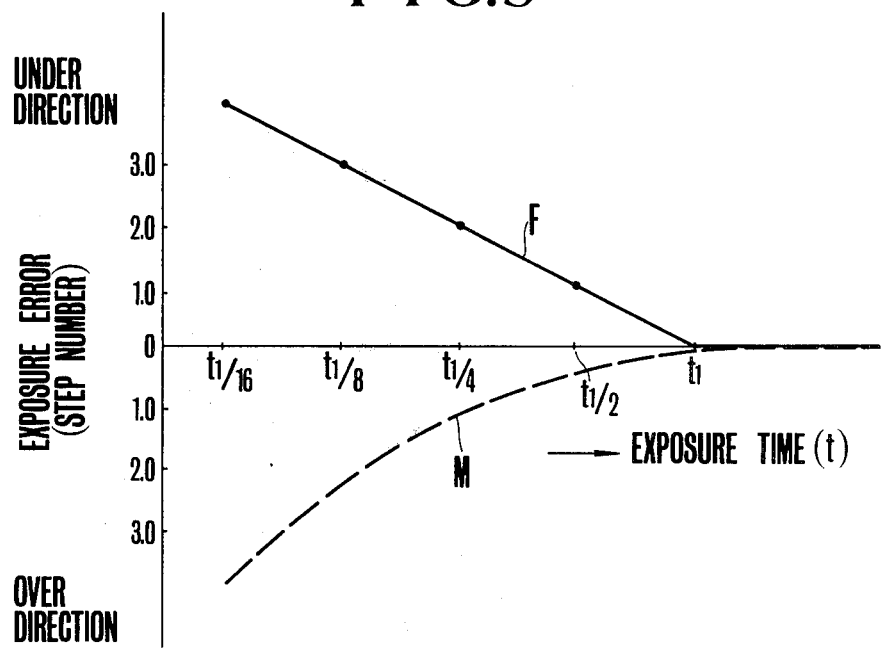
FIG. 9 is a diagram to show properties of an exposure time and an error in exposure.

The letter F in FIG. 9 shows such relationship, and the letter M in the same figure shows an exposure error caused by a relay in response by a shutter control solenoid and mechanical parts.

Figure 10:
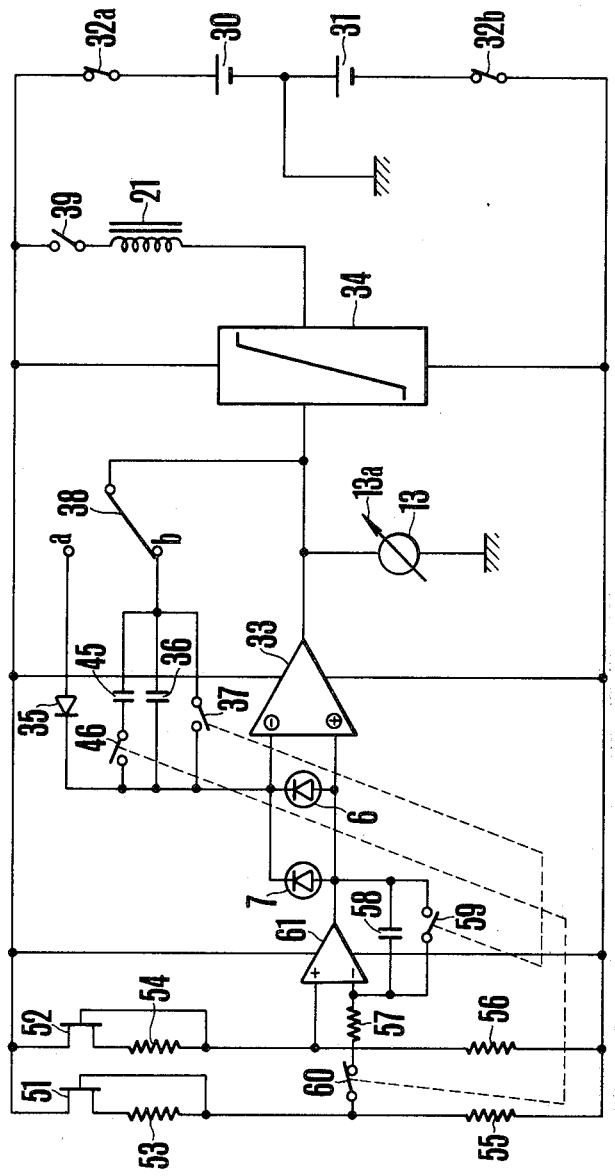
FIG. 10 is a diagram for an exposure control circuit showing an example in which an exposure correction circuit is added to FIG. 7.

FIG. 10 is an electric circuit diagram, in which an error in F of FIG. 9 is corrected by varying timewise the reference voltage of the light measuring circuit at the same time as a shutter is opened to correct an exposure error. In this drawing, same components as in FIG. 7 are represented by same numerals and marks.

The numerals 51, 52 show EFT with constant current, and the numerals 53 to 57 represent resistances, while the numeral 58 shows a capacitor. The numeral 59 shows a switch which is turned OFF in synchronism with the counting switch 37, and the numeral 60 represents a switch which is turned ON in synchronism with the counting switch 37 and is turned OFF in synchronism with the switch 46 as a shutter is fully opened. The numeral 61 shows an operational amplifier, and as the switch 60 is turned OFF and the switch 59 is turned ON while an exposure display circuit is in operation, the operational amplifier 61 works as a voltage follower, and a potential at a contact point of the resistances 54 and 56 is impressed as a reference voltage onto a noninverting input terminal of the operational amplifier 33 for light measuring.

Figure 12:
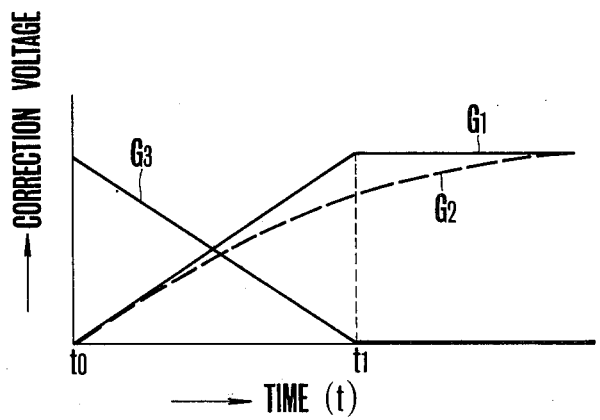
FIG. 12 is a diagram to show changes, along with an elapse of time, in an output voltage of the exposure correction circuit shown in FIGS. 10 and 11.

When a shutter starts opening at the time t0, the switch 59 is turned OFF and the switch 60 is turned ON, and an output of the operational amplifier, that is the reference voltage of the light measuring circuit, linearly increases along with an elapse of time as shown by G1 in FIG. 12. When the shutter is fully opened at the time t1, the switch 60 is turned OFF, therefore the reference voltage acquires a constant level. As has been explained above an exposure error can be corrected by varying timewise the reference voltage of the light measuring circuit until the shutter is fully opened.

Figure 11:
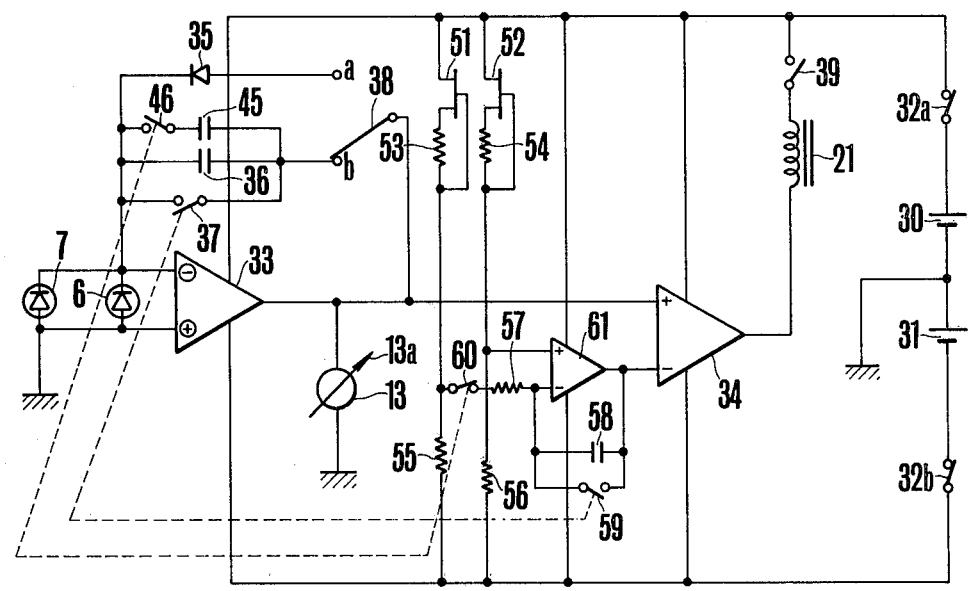
FIG. 11 is a diagram for an exposure control circuit to show another example in which an exposure correction circuit is added to FIG. 7.

FIG. 11 is an electric circuit diagram, in which an exposure error is corrected by varying timewise a trigger level of a shutter control circuit. The numeral 34 represents a control circuit composed of a comparator having two input terminals. An output of the operational amplifier 61 varies as shown by G3 in FIG. 12, so that an error in F of FIG. 9 can be offset.

FIG. 12 shows a timewise variation in an output of the exposure error correction circuits of FIG. 10 and FIG. 11, wherein G1 represents a timewise variation in an output of the exposure error correction circuit of FIG. 10, and G2 represents the same variation when a resistance is connected in parallel with the capacitor 58 of FIG. 10, while G3 represents a same variation in FIG. 11.

Also, when there is a delay in responsive characteristics in a shutter control solenoid as shown by the letter M of FIG. 9, the correction voltage may be so varied timewise as correcting an error which is a sum of M and F.

As has been explained above in detail, in the second example of the present invention, a first light receiving element for sensing light beams reflected from a film surface and a second light receiving element for sensing light beams from an object before a photograph is taken are provided, and an auxiliary diaphragm which is opened at a time a shutter is closed and is gradually closed along with an opening of the shutter is provided in front of the second light receiving element. In addition, the first light receiving element and the second light receiving element are so connected in parallel as to form a light measuring circuit wherein a synthesized output of the first and second light receiving elements has a constant value, then an exposure control corresponding to an output of the light measuring circuit based on said synthesized output is effected. Thus, an electric signal corresponding to an object brightness is always sufficiently input into the light measuring circuit. Therefore, there will be no deterioration in responsive characteristics of the light measuring circuit and a delay in response characteristics of the shutter control solenoid is offset, so that an accurate exposure control can be effected.

Next, explanations will be made on the third example of the present invention referring to FIG. 13 to FIG. 17.

Figure 13:
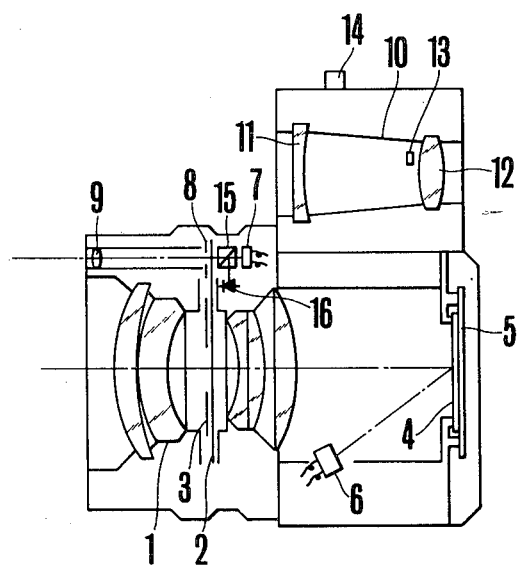
FIG. 13 is a system diagram of a camera showing the third example of the present invention.

FIG. 13 shows an arrangement in a camera, wherein explanations will be made only on such portions as are different from the arrangement in FIG. 1. The numeral 15 represents a half mirror placed between the auxiliary diaphragm 8 and the second light receiving element 7, and this half mirror 15 is a guide for biasing light beams from an illuminant diode 16 to the second light receiving element 7.

Figure 2:
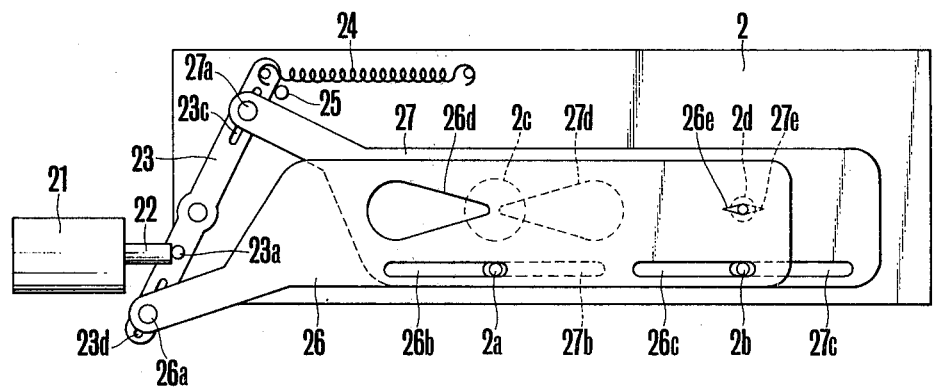
Figure 2:
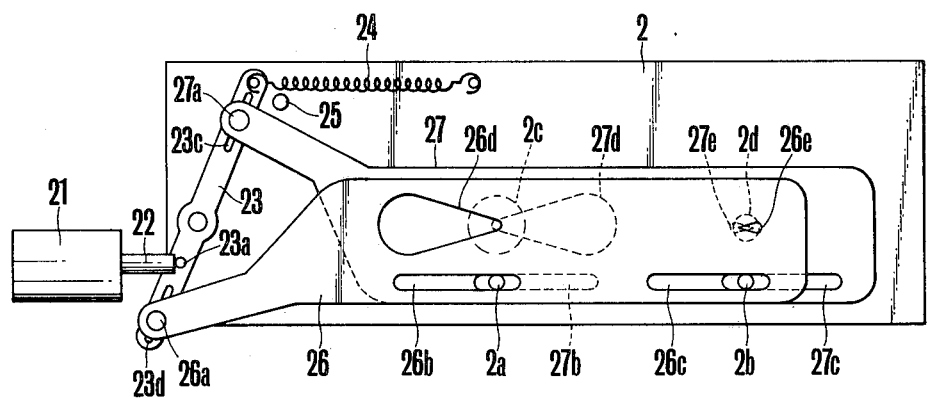
Figure 2:
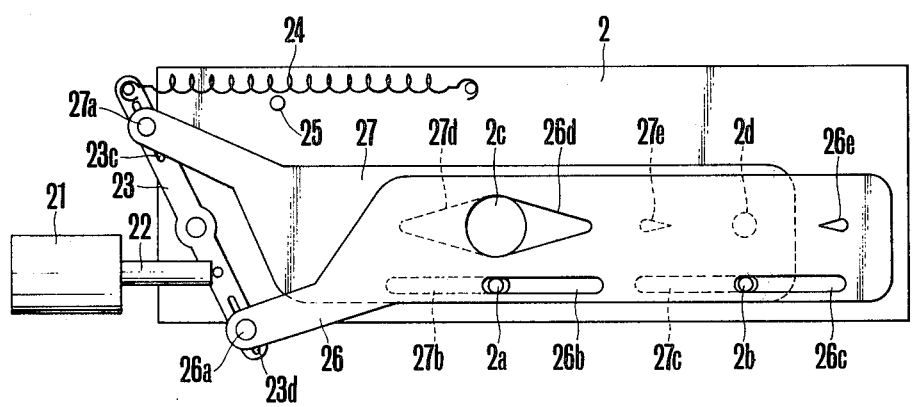
Figure 14:
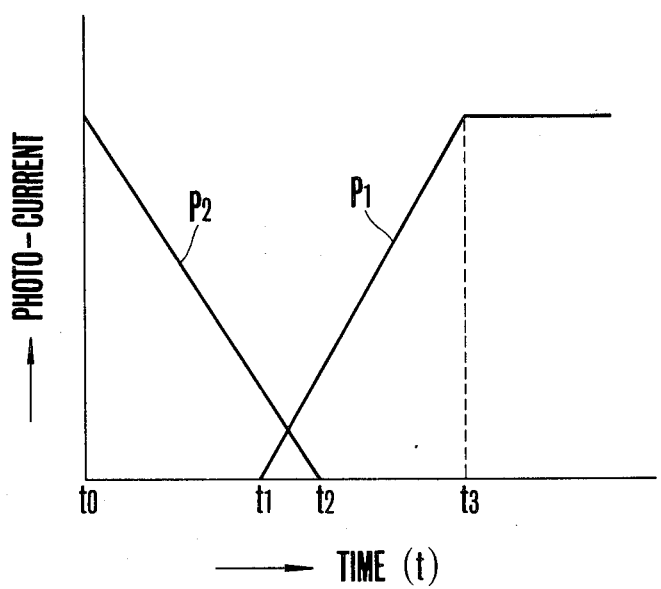
FIG. 14 is a diagram for properties of photo-current of the first and second light receiving elements shown in FIG. 13.

Now, FIG. 14 shows photo-current characteristics of the first light receiving element 6 and of the second light receiving element 7 at a time a photograph is taken, wherein when a shutter button is pressed at the time t0, an amount of incident light into the second light receiving element 7 decreases as shown by P2 in FIG. 2 as the auxiliary diaphragm 8 is closed. The shutter 3 is opened at the time t1 and an exposure onto a film is started. A small amount of photo-current P2 flows at the time t1 so that good response characteristics of the light measuring circuit can be obtained. The shutter is fully opened at the time t3 and photo-current p1 by the first light receiving element 6 acquires a value corresponding to an object brightness.

Figure 15:
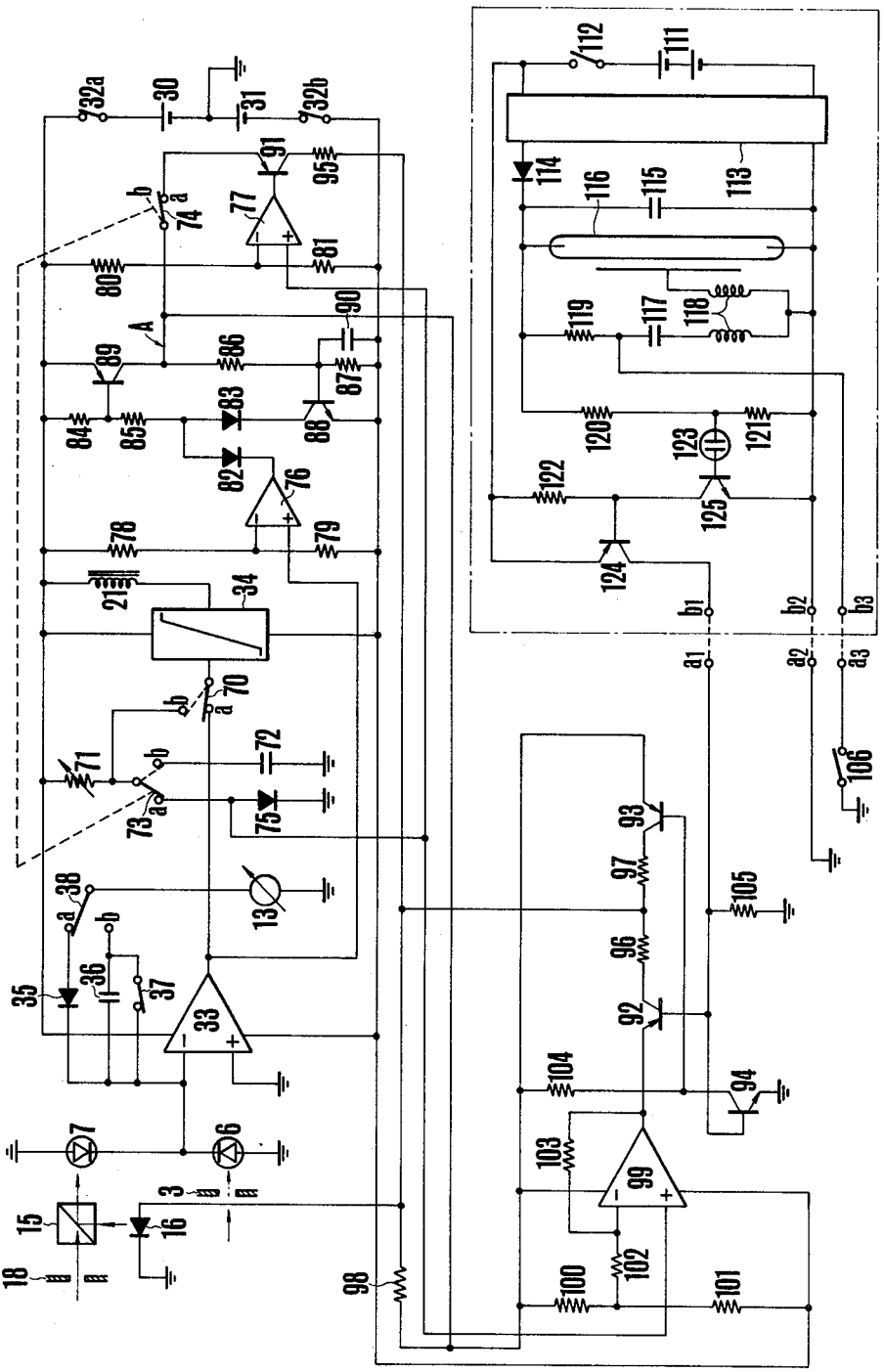
FIG. 15 is a control circuit diagram for a camera shown in FIG. 13 as a stroboscopic device is mounted to the camera.

FIG. 15 shows an exposure control circuit and a flash control circuit of the camera shown in FIG. 13, wherein same components as in FIG. 3 are identified by same numerals and marks and concrete explanations therefor will be omitted. The numeral 70 shows an auto-manual mode change over switch, and a output of the operational amplifier 33 is input into the time control Schmidt circuit 34 by changing over the change over switch 70 to the contact "a", while a terminal voltage of a capacitor 72 which is charged through a manual time setting resistance 71 is input into the Schmidt circuit 34 by changing over the change over switch 70 to the contact "b".

The numeral 73 shows a change over switch associated with a switch 74, and these switches 73, 74 change over an ordinary photographing mode and a limit mode. A limit mode is provided when the switch 73 is changed over to the contact "a" and the switch 74 is in ON state. The numeral 75 shows a logarithmic compression diode, which logarithmically compresses a signal of the resistance 71. The numerals 76 and 77 represent operational amplifiers which function as comparators, and a divided voltage of a bleeder resistances 78, 79 or 80 is input into an inverting input of said operational amplifier. The numerals 82 to 90 represent transistors, diodes, resistances and capacitors composing a voltage retention circuit. The numerals 91, 92, 93 and 94 show switching transistors. Current flowing to the illuminant diode 16 for a biasing power source is varied through limiting resistances 95, 96, 97 and 98. The numeral 99 is an operational amplifier and the numerals 100 to 103 are resistances of the amplifier 99. The numerals 104, 105 are bias resistances for the switching transistors. The numeral 106 is a X contact switch, and letters a1, a2, a3 represent contacts to a flash device.

A circuit enclosed by one dot chain line is a flash control circuit for optically limiting a shutter time of a camera to a shutter time suitable for a flash photo-taking by a charge completion signal. That is, a voltage of a power source 111 is increased to a high level through a DC booster circuit 113 as a power switch 112 is turned ON to charge a main capacitor 115. When a terminal voltage of the capacitor 115 begins to have a prescribed value or higher a neon tube 113 for a charge completion display has power conducted therethrough and a charge completion signal is transmitted from the terminals b1, b2 to the terminal a1, a2 at a camera side through transistors 124, 125. Also, the numeral 116 shows a flash discharge tube, and 117, 118, 119 show a trigger circuit of the tube 116, which is triggered through the terminals b3, a3 as the X contact switch 106 is turned ON.

Next, explanations will be made on a function of the above explained arrangement.

First, when the shutter button 14 is pressed the power source switches 32a, 32b are turned ON, and the circuit is placed in an operative state. At this time, the shutter 3 of the photo-taking lens 1 is closed and the second light receiving element 7 only generates a photo-current corresponding to an object brightness. Said photo-current is logarithmically compressed through the operational amplifier 33 which has logarithmic compression characteristics, and a shutter time corresponding to an object brightness is displayed by the display meter 13. When an object brightness is low and an output of the operational amplifier 33 is below a prescribed voltage at the time of this light measuring, an output of the comparator 76 acquires a low level. Therefore, the transistors 88, 89 of the voltage retention circuit are turned ON, and the voltage of the collector of the transistor 89 as its output is retained.

When a photographing mode of a camera is set at an ordinary auto mode, the change over switch 70 is changed over to the contact "a", and the change over switch 73 is changed over to the contact "b", while the switch 74 is turned OFF. When the shutter button 14 is further pressed down under this state, the change over switch 38 is changed over from "a" to "b", and an exposure is started at the time t1 in FIG. 2, then the counting switch 37 is turned OFF and the integration capacitor 36 starts an integration. An output of the operational amplifier 33 is input into the Schmidt circuit 34 through the switch 70 and as said output reaches a prescribed value, the Schmidt circuit 34 is inverted to place the shutter control magnet 21 in OFF state, closing the shutter. When an object brightness in this ordinary auto mode is below a prescribed value, an output of the comparator 76 acquires a low level that is "0" and the voltage retention circuit is in a retention state, therefore the output voltage thereof (voltage at the point "A") flows to the illuminant diode 16 as a biasing power source through the resistance 98. Said current is made to have a very small value by so selecting the resistance value of the resistance 98. Thus, it limits the longest value of shutter time. That is, it serves to prevent an excessive time exposure resulting in a waste of energy in a battery when an object brightness is too low or a release is made with a lens cap being placed over a lens.

Next, when the mode change over switch is changed over to the limit auto mode, while the A–M change over switch 70 is kept at the contact "a", the mode change over switch 73 is changed over to the contact "a" and the switch 74 associated therewith is turned ON. When, for example, a shutter time which is blurring due to limit time for avoiding a hand vibrations is set at the resistance 71 by operating a manual time setting dial, current flows from the resistance 71 to the compression element 75, and the arithmetrical series voltage corresponding to said shutter time set at the manual dial is generated at the element 75. When a flash light device is not mounted on a camera or a charging of a flash light device is not completed the transistor 94 is in an OFF state, therefore the transistor 93 is also in OFF state, while the transistor 92 is turned ON.

The voltage generated thereby at the compression diode 75 is generated at the output of the operational amplifier 99, and flows to the illuminant diode 16 as a biasing power source through the transistor 92 and the resistance 96. By this, biasing light beams corresponding to the limit time being set at the manual set dial are incident into the second light receiving element 7, thus a shutter time is optically limited.

Figure 16:
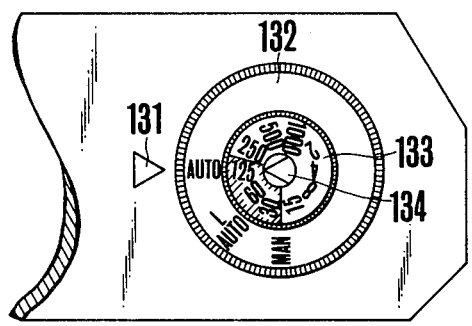
FIG. 16 is to show operating members of the circuit shown in FIG. 15 and is a plan view of a photographing mode change over dial and a manual time setting dial.

FIG. 16 shows an example of a change over dial for the mode change over switches 70, 73 and 74 in FIG. 15 and of a dial to set the manual time setting mechanism 71, wherein the dials are placed at an appropriate position of an external surface of a camera. In this drawing, the numeral 131 shows a mode change over mark, the numeral 132 a mode change over dial, 133 a manual time setting dial, 134 a manual time setting mark, wherein a portion hatch lined on the dial 133 shows a limit zone in a limit auto mode. In the same drawing, if for example the limit auto (L-auto) on the mode change over dial 132 is matched with the mark 131, the switch 70 in FIG. 15 is changed over to "a", and the switch 73 is changed over to the contact "a", while the switch 74 is turned ON. Also, if "30" on the manual time setting dial 133 is matched with the mark 134, such voltage as corresponding to 1/30 second is generated at both ends of the compression diode 75 through the resistance 71. When such signal as corresponding to a shutter time of 1/15 second is output from the operational amplifier 33 of the light measuring circuit at this time, an output of the comparator 76 becomes a logic "0" and a voltage of the output (at the point "A") of the voltage retention circuit becomes a logic "1" as said signal has a value lower than the reference value. Since the voltage of the diode 75 is higher than the reference value a bias current flows from an output of the operational amplifier 99 to the biasing light source 16 through the transistor 92 and the resistance 96, and the light energized diode 9 emits light. By this, a photo-current of the second light receiving element 7 is added to an input of the amplifier 33, and an output of the amplifier 33 attains a value corresponding to a shutter time of 1/30 second. By this, the Schmidt circuit 34 and the magnet 21 are actuated through the switch 70, and after the shutter button is pressed down to change over the switch 38 to "b" and the trigger switch 37 is turned OFF, a shutter time will function at the 1/30 second which has been set at the manual time setting dial, thus blurring due to hand vibrations of the photographer's hand when an object brightness is low can be prevented. A setting zone for the dial 133 in said limit auto mode is so made as can be set within a range shown in hatched lines in the drawing, so that it can be suitably set depending on a skill of a photographer or other conditions. Next, when the mode change over dial 132 of FIG. 16 is set at "MANU", the switches 70, 73 in FIG. 15 are changed over to "b", and the switch 74 is turned OFF. And a shutter time under this state is controlled to such time as determined by time constant of the time setting resistance 71 and the capacitor 72. Here, while the light measuring circuit is used only for a display of the meter 13 by an output of the amplifier 33, very low level of biasing current for limiting the longest shutter time flows to the light emitting diode 16 through the resistance 98, but it has no bearing on a shutter time.

Next functional, explanations will be made when a flash light exposure is made with the flash light device of FIG. 15 mounted on a camera. When the terminals b1, b2, b3 of the flash light device are connected to the flash light connecting terminals a1, a2, a3 of a camera, respectively and the power source switch 112 of the flash light device is turned ON, a high voltage is generated by the DC booster circuit 113 and the main capacitor 115 is charged through a rectifier diode 114. When a voltage between the terminals of the capacitor 115 reaches a prescribed value or higher, the neon tube 123 has power conducted therethrough, and the transistors 125 and 124 are turned ON. By this, a charge completion signal of the flash light device is transmitted to a camera side through the terminals a1, b1, a2, b2, and the transistors 93, 94 are turned ON and the transistor 92 is turned OFF by said signal. As the transistor 93 turned ON the output voltage (point "A") of the voltage retention circuit is supplied to the light emitting diode 16 through the resistance 97. This biasing current is made to form a shutter time for a flash light exposure by suitably selecting the resistance value of the resistance 97. Therefore, when a flash light device is mounted on a camera and a charge completion signal of the flash light device is transmitted to a camera side, a shutter time of a camera will be automatically limited to a shutter time for a flash light photography. This is done in an optical manner in a device of the example of the present invention.

Figure 17:
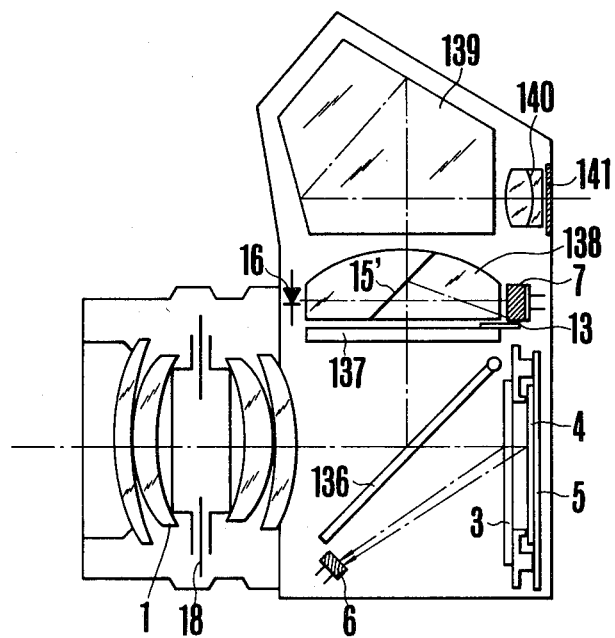
FIG. 17 is a system diagram for a case when a camera in FIG. 13 is modified to a single lens reflex camera of TTL type.

FIG. 17 is a diagram showing an arrangement of important parts reflecting an example in which an optical shutter time limiting mechanism is applied to a single lens reflex camera of TTL type, illustrating a camera of a light measuring system for light beams reflected from a film surface. In this drawing, the numeral 136 shows a quick return mirror, the numeral 137 a focal plate, the numeral 138 a condensor lens having a half mirror part 15' at its center part, the numeral 139 a pentagonal prism, the numeral 140 an eye piece lens, and the numeral 141 an eye piece shutter which is associated with the mirror 136 and shields the incident light from the photo-taking lens 140 while the mirror is going up. The other parts are shown with same numerals and marks as those of FIG. 13. That is, the second light receiving element 7 receives light beams from the half mirror of the condensor lens at a time the mirror descends. It also it receives light beams from the diode 16 as a biasing light source being provided at an opposite side of the element 7. The first light receiving element 6 receives light beams reflected from the film plane 4 or a screen plane of a focal plane shutter. The camera shown in this drawing can perform almost same function as that of the camera shown in FIG. 13 with the circuit shown in FIG. 15. That is, when the shutter button of the camera is pressed, such photo-current as corresponds to an object brightness is generated by the second light receiving element 7, and such shutter time as corresponds to an object brightness is displayed by the meter 13 within a view finder through the operational amplifier 33 for light measuring. Further, the quick return mirror 136 ascends and an amount of incident light into the second light receiving element 7 decreases by pressing the shutter button. When the shutter starts to open the counting switch 37 turns OFF and light beams reflected from the shutter screen 3 and the film surface 4 will be incident into the first light receiving element 6. The photo-current generated at the first light receiving element 6 by said light beams is integrated by the capacitor 36, and a shutter time control is done by the Schmidt circuit 34 and the magnet 21 with an output of the amplifier 33. At this time, various kinds of biasing current is supplied to the light emitting diode 16 as a biasing light source and to the second light receiving element 7, and a limiting of such shutter time as corresponds thereto will be done. That is, the second light receiving element 7 is connected to an input of the operational amplifier 33 in parallel with the first light receiving element 6, and only light beams from the light emitting diode 16 are incident into the second light receiving element 7 through the half mirror 15', therefore, limitation of various shutter times will be done as described in detail for the function of FIG. 15. Also counter incident light beams from a finder eye piece part can be prevented by closing the eye piece shutter in association with the ascending of the mirror. Also biasing light beams will be incident into the second light receiving element 7 only but will not be incident on the first light receiving element 6 which receives the light beams reflected from a film surface, therefore, limitation can be made on shutter time being suitable for various photographic modes without adversely affecting the on photo-sensitive material.

As has been explained above, an exposure control device according to the third example of the present invention can be applied not only to an ordinary camera of a lens shutter type but also that a single lens reflex camera of a type to receives light beams reflected from a film surface. In either case, such shutter time limitations can be made suitable for various photographic modes, while producing an adverse effect over the film by biasing light beams, thus it has great advantages.

What is claimed is:

1. An exposure control device for a camera, comprising:
   a shutter which also functions as a diaphragm;
   a first light receiving element which is capable of sensing light beams reflected from a film surface when said shutter is released;
   a second light receiving element which is capable of sensing light beams coming from an object before said shutter is released;
   an auxiliary diaphragm which is disposed in front of said second light receiving element and is responsive to opening and closing actions on said shutter, said auxiliary diaphragm being arranged to open so as to allow said light beams coming from said object to be incident on said second light receiving element when said shutter closes and to close so as to prevent said light beams from said object from falling on said second light receiving element when said shutter opens; and
   light measuring means having the first light receiving element and the second light receiving element, the light measuring means having an operational amplifier for light measuring, which has the first light receiving element and the second light receiving element connected in parallel between input terminals of the operational amplifier;
   wherein exposure control is performed based on an output value of the operational amplifier corresponding to an amount of incident light into the first light receiving element, and, at the time the shutter is released, delay in transient response of the light measuring means is reduced based on said output value of the operational amplifier corresponding to an amount of incident light into the second light receiving element.

2. A device according to claim 1, in which the auxiliary diaphragm is closed during opening of the shutter.

3. A device according to claim 2, in which the auxiliary diaphragm is formed by a member or members associated with the shutter.

4. A device according to claim 1, which further comprises a means to make a preliminary display of an exposure based on an output of the operational amplifier corresponding to an amount of incident light into the second light receiving element.

5. An exposure control device for a camera, comprising:
   a shutter which also functions as a diaphragm;
   a first light receiving element which is capable of sensing light beams coming from an object when said shutter is released;
   a second light receiving element which is capable of sensing light beams coming from an object before said shutter is released;
   an auxiliary diaphragm which is provided in front of said second light receiving element for controlling the quantity of light beams from said object incident on said second light receiving element, said auxiliary diaphragm being arranged to open in response to a closing action on said shutter and to gradually close as the shutter opens; and
   light measuring means having the first light receiving element and the second light receiving element, the light measuring means having an operational amplifier for light measuring and having the first light receiving element and the second light receiving element connected in parallel between input terminals of the amplifier wherein a synthesized output of the first light receiving element and of the second light receiving element is always maintained at a prescribed value and exposure control is effected based on an output of the operational amplifier corresponding to the synthesized output.

6. A device according to claim 5, in which a ratio of change in the opening of the shutter as it is opened and a ratio of change in the opening of the auxiliary diaphragm as it is closed are made to be equal.

7. A device according to claim 5, in which the light measuring means has a reference voltage regulating means which regulates the reference voltage for the light measuring means as the shutter is opened.

8. A device according to claim 5, which further comprises an exposure control means to control an opening time of the shutter based on the output of the light measuring means, the control means having a level regulating means which regulates a trigger level of the control means as the shutter is opened.

9. An exposure control means for a camera, comprising:
   a shutter which also functions as a diaphragm;
   a first light receiving element which is capable of sensing light beams reflected from a film surface when said shutter is released;
   a second light receiving element which is capable of sensing light beams coming from an object before said shutter is released;
   an auxiliary diaphragm which is disposed in front of said second light receiving element and is responsive to opening and closing actions on said shutter, said auxiliary diaphragm being arranged to open so as to allow said light beams coming from said object to be incident on said second light receiving element when said shutter closes and to close so as to prevent said light beams from said object from falling on said second light receiving element when said shutter opens;
   light measuring means having the first light receiving element and the second light receiving element, the light measuring means having an operational amplifier for light measuring and having the first light receiving element and the second light receiving element connected in parallel between input terminals of the amplifier;
   illuminant means to have biasing light beams incident into the second light receiving element;
   power supply control means to supply power to the illuminant means, the power supply control means supplying power to the illuminant means corresponding to a shutter release ;
   wherein biasing light beams are made to be incident upon the second light receiving element when exposure control is performed based on an output of the operational amplifier for light measuring, thus limiting the exposure time.

10. A device according to claim 9, in which the power supply control means has a means to continuously supply a very small amount of current to the illuminant means, the supply means limiting the longest exposure time within a prescribed value.

11. A device according to claim 9, in which the power supply control means includes a means to regulate an amount of power supplied corresponding to a manual shutter time regulating action.

12. A device according to claim 9, in which the power supply control means has a means to supply a level of power corresponding to a flash light time to the illuminant means, wherein the supply means is actuated by a charge completion signal.

13. An exposure control device for a camera, comprising:
   a shutter;
   a first light receiving element which is capable of sensing light beams from an object when the shutter is released;
   a second light receiving element which is capable of sensing light beams coming from an object before said shutter is released;
   light measuring means having the first light receiving element and the second light receiving element, the light measuring means having an operational amplifier for light measuring and having the first light receiving element and the second light receiving element connected in parallel between input terminals of the amplifier;
   illuminant means for having biasing light beams incident on the second light receiving element;
   power supply control means for supplying power to the illuminant means; and
   exposure control means which controls an opening time of the shutter based on an output of the operational amplifier for light measuring.

14. An exposure control device for a camera, comprising:
   a shutter which also functions as a diaphragm;
   a first light receiving element which is capable of sensing light beams coming from an object when said shutter is released;
   a second light receiving element which is capable of sensing beams coming from an object before said shutter is released;
   an auxiliary diaphragm which is disposed in front of said second light receiving element and is responsive to opening and closing actions on said shutter, said auxiliary diaphragm being arranged to open so as to allow said light beams from said object to be incident on said second light receiving element when said shutter closes and closes so as to prevent said light beams from said object from falling on said second light receiving element in response to a closing action on said shutter;
   light measuring means having the first light receiving element and the second light receiving element, the light measuring means having an operational amplifier for light measuring and having the first light receiving element and the second light receiving element connected in parallel between input terminals of the amplifier; and
   exposure control means which controls an opening time of the shutter based on an output of the operational amplifier for light measuring.

15. An exposure control device for a single lens reflex camera, comprising:
   a movable mirror which is in a descended position prior to photographing and moves from said descended position to an ascended position for photographing;
   a first light receiving element which is capable of measuring at least reflection light beams coming either from a surface of a shutter diaphragm or from a surface of film when said movable mirror has moved to said ascended position thereof;
   a second light receiving element which is capable of measuring reflection light beams coming from said movable mirror when said mirror is in said descended position;

light measuring means having said first and second light receiving elements, said means including a photometric operational amplifier with said first and second light receiving elements connected in parallel between the input terminals of said operational amplifier;

light emitting means for causing a bias light to be incident on said second light receiving element;

power supply control means for effecting power supply to said light emitting means; and exposure control means which controls exposure time according to an output of said photometric operational amplifier, said exposure time being arranged to be controlled by the incidence of said bias light on said second light receiving element.

16. A device according to claim 15, wherein said light emitting means is a light emitting diode.

17. A device according to claim 15, further including a view finder to which reflection light beams coming from said movable mirror are guided before photographing, said view finder being provided with a finder eyepiece.

18. A device according to claim 15, wherein said power supply control means is provided with a detecting means for detecting whether or not the output of said light measuring means is lower than a predetermined value, said detecting means being arranged to apply a predetermined amount of electric current to said light emitting means when the detected value of said output of said light measuring means is lower than said predetermined value.

19. A device according to claim 18, wherein said power supply control means is provided with a supply means which constantly supplies a slight amount of electric current to said light emitting means and is also provided with a switching means for selectively connecting said supply means or said detecting means to said light emitting means.

20. A device according to claim 15, wherein said power supply control means is provided with means for constantly supplying a slight amount of electric current to said light emitting means.

* * * * *